3,572,088
Patented Mar. 23, 1971

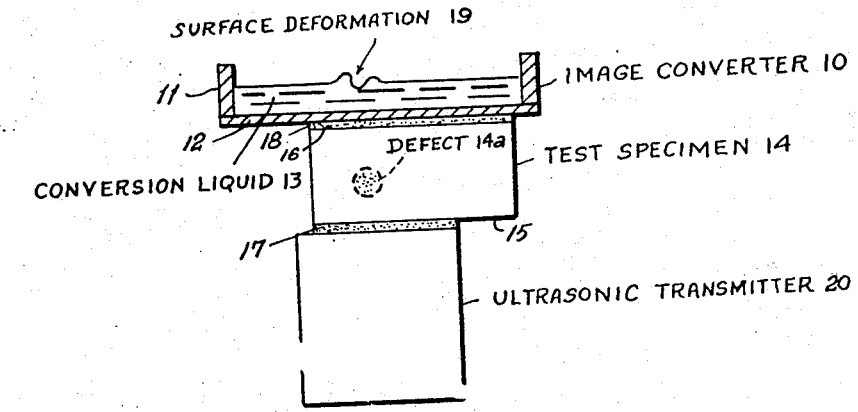
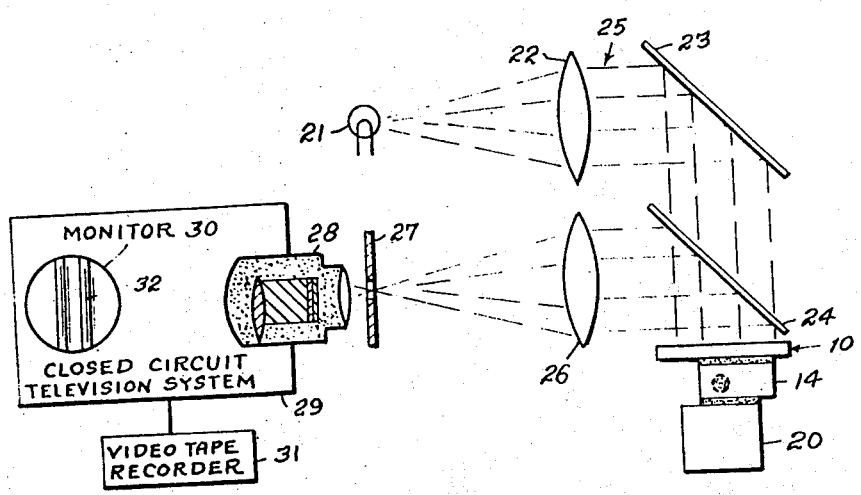
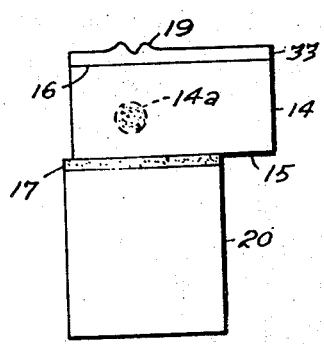

3,572,088
DEVICE FOR CONVERSION OF ULTRASONIC IMAGES INTO VISIBLE DISPLAYS
Otto R. Gericke, Medfield, and Robert C. Grubinskas, Holliston, Mass., assignors to the United States of America as represented by the Secretary of the Army
Filed Feb. 20, 1968, Ser. No. 706,985
Int. Cl. G01n 29/04
U.S. Cl. 73—67.6
5 Claims

ABSTRACT OF THE DISCLOSURE

Apparatus for ultrasonic visualization of discontinuities in optically opaque materials wherein the test specimen is not immersed in a liquid medium.

---

The invention described herein may be manufactured, used, and licensed by or for the Government for governmental purposes without the payment to us of any royalty thereon.

The usual means employed for ultrasonic imaging for determining concealed defects in materials utilizes a tank filled with water or oil in which both the specimen and the ultrasonic transmitter are immersed. This necessitates the use of combersome test apparatus and the fact that the test specimen and ultrasonic transmitter are immersed in the liquid bath results in concomitant corrosion effects. Another disadvantage is that when the test specimen is moved relative to the ultrasonic imaging device interference patterns are created due to turbulence.

In the apparatus of the invention a new and novel image converter based on the principle that the surface of a free liquid will be deformed in accordance with the cross-sectional intensity distribution of an impinging ultrasonic beam is employed whereby it enables a visual ultrasonic inspection of a specimen to be performed without immersing the specimen in the liquid.

Accordingly, an object of the invention is a new and novel ultrasonic imaging apparatus and method for determining concealed defects in both metallic and nonmetallic materials.

Another object of the invention is an ultrasonic imaging apparatus wherein the test specimen does not have to be immersed in a liquid medium.

Another object of the invention is an ultrasonic imaging apparatus wherein the test specimen may be moved relative to the ultrasonic imaging device without causing turbulence interference patterns.

Another object of the invention is an ultrasonic imaging apparatus wherein the disturbances of the free liquid surface due to environmentally induced vibrations are greatly reduced.

A fuller understanding of the invention may be had by referring to the following description and claims in conjunction with the drawings in the several figures of which like numerals identify like elements and in which:

FIG. 1 is a schematic representation of one embodiment of the invention;

FIG. 2 is a schematic representation of another embodiment of the invention; and FIG. 3 is a schematic representation of a still further embodiment of the invention.

The ultrasonic imaging device of the invention is based upon the physical principle that a beam of ultrasonic energy incident upon a free liquid surface will distort the surface to form a relief pattern which is a replica of the cross-sectional energy distribution of the ultrasonic beam. This effect is known as the liquid surface levitation. Now with reference to FIG. 1, the liquid surface levitation converter or image converter 10 consists of, for example, a metallic cylindrical vessel 11 closed at one end by means of a thin flexible plastic membrane 12 which is used to support a relatively thin (5 mm.) layer of conversion liquid 13. Instead of using a plastic membrane to support the conversion liquid 13, a membrane of other substance such as thin aluminum may be used.

Fluids possessing relatively high viscosities, such as 30 weight motor oil, are used as conversion liquids instead of water. Colorless fluids are tinted to facilitate optical visualization of a surface relief. By using a tinted high viscosity fluid for the conversion liquid only light reflected from the deformed surface of the liquid can be seen while light transmitted through the liquid is greatly reduced in brightness. Thus, a clearer optical image is obtained.

Again with reference to FIG. 1, reference numeral 14 indicates the test object having a concealed defect 14a and two parallel surfaces 15 and 16. The test object 14 is coupled to an ultrasonic transmitter 20 by means of a layer of glycerine 17 positioned between and in contact with the ultrasonic transmitter and the parallel surface 15 of the test object 14. The other parallel surface 16 is coupled to the flexible membrane 12 by glycerine coupling means 18. In operation, the ultrasonic transmitter propagates an ultrasonic beam through the test object to produce relief characteristics on the surface of the conversion liquid as generally indicated by reference numeral 19. Internal defects such as cavities or inclusions of foreign matter which scatter or absorb ultrasonic intensity modulate the ultrasonic beam being propagated through the test object and into the image converter to produce characteristic relief patterns on the surface of the conversion liquid as generally indicated by reference numeral 19. When it is desired to obtain a permanent three dimensional record of the ultrasonic image, the image converter 10 is not used and in its place a pliable plastic or a solidifying liquid 33 is applied drectly to surface 16 of test object 14 as illustrated in FIG. 3.

Another embodiment of the invention, which is described in the following, concerns relief patterns which are not ordinarily discernible by the human eye. Broadly, by reflecting a parallel beam of light off the conversion liquid surface, the relief pattern can be transformed into a shadow image which is carried by a closed circuit television system whereby an electronically magnified readout is obtained which, in turn, can be permanently recorded by means of a video tape recorder. In FIG. 2 the ultrasonic transmitter 20, test object 14 and image converter 10 are arranged as described in the foregoing and as illustrated in FIG. 1. A 100 watt mercury short-arc lamp possessing an arc size of 0.3 x 0.3 mm. is used to approximate an intense point source of light 21. The light emanating from the point source of light 21 is collimated as it passes through lens 22. A front surface mirror 23 is angularly disposed in the path of the collimated beam of light 25 and a transparent mirror or beam splitter 24 is in angular alignment with front surface mirror 23 and spaced from and opposite conversion liquid 13. The collimated beam of light 25 impinges upon front front surface mirror 23 and is reflected vertically downward through the transparent mirror or beam splitter 24 onto the ultrasonically stimulated surface of the conversion liquid 13 which reflects the collimated beam. The reflected light, approximately 5% of the incident light, which has been optically modulated by the relief pattern, is reflected by the beam splitter 24 and passed through the converging lens 26 and a diaphragm 27 into a vidicon tube 28 of a closed circuit television system 29. The resulting video image 32 is displayed on the screen of the monitor 30 and, when desired, recorded by means of a video tape recorder 31 coupled into the closed circuit television system.

We claim:

1. Apparatus for ultrasonic visualization of discontinuities in optically opaque materials, comprising in combination an ultrasonic generator, an optically opaque test specimen formed with two parallel surfaces, a layer of glycerine coupling one of said parallel surfaces and said ultrasonic generator, and means applied to the other of said parallel surfaces of obtaining a permanent three dimensional ultrasonic image of said specimen when the ultrasonic beam generated by said ultrasonic generator is transmitted through said specimen and said means.

2. The invention in accordance with claim 1 wherein said means comprises a pliable plastic.

3. The invention in accordance with claim 1 wherein said means comprises a solidifying liquid.

4. Apparatus for ultrasonic visualization of discontinuities in optically opaque materials, comprising in combination an ultrasonic generator, an optically opaque specimen formed with two flat parallel surfaces, an image converter consisting of a cylindrical member closed at one end by a flexible membrane responsive to ultrasonic radiation, a thin layer of high viscosity liquid in said cylindrical member in contact with said membrane, a first layer of glycerine coupling said ultrasonic generator and one of said flat parallel surfaces, and a second layer of glycerine coupling the other of said flat parallel surfaces with said flexible membrane, relief patterns of said specimen formed at the free surface of said conversion liquid in response to the ultrasonic beam transmitted by said ultrasonic generator through said specimen, membrane and conversion liquid.

5. The invention in accordance with claim 4 wherein said high viscosity liquid comprises a tinted liquid of high viscosity.

References Cited

UNITED STATES PATENTS

| | | | |
|---|---|---|---|
| 2,532,507 | 12/1950 | Meunier | 73—67.5X |
| 2,832,214 | 4/1958 | Trommler | 73—67.6 |
| 3,199,069 | 8/1965 | Lord et al. | 73—67.6X |

RICHARD C. QUEISSER, Primary Examiner

A. E. KORKOSZ, Assistant Examiner